(12) United States Patent
Ienaga

(10) Patent No.: US 9,376,112 B2
(45) Date of Patent: Jun. 28, 2016

(54) VEHICLE CONTROL DEVICE AND VEHICLE CONTROL METHOD

(71) Applicant: FUJI JUKOGYO KABUSHIKI KAISHA, Tokyo (JP)

(72) Inventor: Hiroshi Ienaga, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/735,409

(22) Filed: Jun. 10, 2015

(65) Prior Publication Data

US 2015/0360693 A1      Dec. 17, 2015

(30) Foreign Application Priority Data

Jun. 16, 2014      (JP) .................................. 2014-123297

(51) Int. Cl.
   *B60T 7/12*       (2006.01)
   *B60W 30/18*      (2012.01)
   *B60W 40/105*     (2012.01)

(52) U.S. Cl.
   CPC ....... *B60W 30/18172* (2013.01); *B60W 40/105* (2013.01); *B60W 2520/28* (2013.01); *B60W 2720/26* (2013.01)

(58) Field of Classification Search
   USPC .......................................................... 701/90
   See application file for complete search history.

(56) References Cited

U.S. PATENT DOCUMENTS

| | | | | |
|---|---|---|---|---|
| 6,629,026 B1 * | 9/2003 | Baraszu | ................... | B60K 6/48 180/65.25 |
| 9,150,203 B2 * | 10/2015 | Watanabe | ............. | B60T 8/1755 |
| 2001/0038240 A1 * | 11/2001 | Yoshida | ................... | B60T 7/042 303/28 |
| 2003/0183431 A1 * | 10/2003 | Cikanek | ................... | B60K 6/48 180/65.6 |
| 2004/0207257 A1 * | 10/2004 | Faye | ........................ | B60T 7/12 303/125 |
| 2006/0004509 A1 * | 1/2006 | Teslak | ...................... | B60K 6/12 701/84 |
| 2006/0258508 A1 * | 11/2006 | Tanioka | .................. | B60R 25/04 477/203 |
| 2008/0177434 A1 * | 7/2008 | Moran | ..................... | B60K 6/12 701/22 |
| 2009/0115247 A1 * | 5/2009 | Leiber | ..................... | B60T 7/042 303/154 |

FOREIGN PATENT DOCUMENTS

| | | |
|---|---|---|
| JP | 2007-228722 A | 9/2007 |
| JP | 2008-236914 A | 10/2008 |
| JP | 2012-029473 A | 2/2012 |

* cited by examiner

*Primary Examiner* — Hussein A. Elchanti

(74) *Attorney, Agent, or Firm* — Chip Law Group

(57) ABSTRACT

A vehicle control device includes motors that drive respective tires via drive shafts, a reference rotation speed calculating module that calculates torsional amounts of the drive shafts on the basis of a required torque, and outputs a reference rotation speed for a slip determination, the reference rotation speed being obtained by adding the torsional amounts to rotation speeds of the motors, the rotation speeds corresponding to a vehicle speed, and slip determiners that compare the rotation speeds of the motors with the reference rotation speed to determine whether or not the tires are slipping, and a rotation speed control module that controls the rotation speeds of the motors on the basis of a target rotation speed when it is determined that the tires are slipping.

5 Claims, 7 Drawing Sheets

VEHICLE CONTROL DEVICE AND VEHICLE CONTROL METHOD

CROSS-REFERENCE TO RELATED APPLICATIONS

The present application claims priority from Japanese Patent Application No. 2014-123297 filed on Jun. 16, 2014, the entire contents of which are hereby incorporated by reference.

BACKGROUND

1. Technical Field

The present disclosure relates to a vehicle control device and a vehicle control method.

2. Related Art

Conventionally, for example, Japanese Unexamined Patent Application Publication (JP-A) No. 2012-029473 describes that a slip of drive wheels is determined on the basis of a comparison of a value corresponding to estimated motor rotation speed with a value corresponding to the actual motor rotation speed, the estimated motor rotation speed being estimated by using a transmission characteristic between motor torque and motor rotation speed based on the torsional rigidity of a drive system.

It is desirable to suppress, in as short a time as possible, a slip of drive wheels, which occurs when a vehicle begins to move or travels at very slow speed. It is, however, difficult to suppress a slip when drive units such as motors are configured to be connected with respective tires (wheels) via drive shafts because feedback control over the drive units based on the tire rotation speed obtained from a sensor increases time delay in detection owing to the separation of the tires from the drive units, and the tire rotation speed increases during this time delay.

Meanwhile, feedback control over the drive units based on the rotation speed of the drive units obtained from a sensor can certainly decrease time delay, but torsional vibration of the drive shafts may unfortunately degrade controllability because the drive shafts are installed between the drive units and the tires.

The technology described in JP-A No. 2012-029473 determines a slip of drive wheels, on the basis of a comparison of a value corresponding to estimated motor rotation speed with a value corresponding to the actual motor rotation speed, the estimated motor rotation speed being based on the torsional rigidity of a drive system. However, control based on tire rotation speed after a slip determination increases tire rotation speed during time delay as mentioned above, so that it is difficult to suppress a slip. If control based on motor rotation speed continues after a slip determination, torsional vibration of drive shafts as mentioned above unfortunately degrades controllability.

SUMMARY OF THE INVENTION

The present disclosure was achieved in view of the disadvantages, and the present disclosure provides a novel and improved vehicle control device and vehicle control method that can instantaneously determine a slip of a tire in driving the tire via a drive shaft, suppress the slip, and prevent torsional vibration of the drive shaft from reducing controllability.

An aspect of the present disclosure provides a vehicle control device including at least one drive unit that drives a corresponding tire via a drive shaft, a reference rotation speed calculating module that calculates a torsional amount of the drive shaft on the basis of a required torque, and outputs a reference rotation speed for a slip determination, the reference rotation speed being obtained by adding the torsional amount to a rotation speed of the drive unit, the rotation speed corresponding to a vehicle speed, at least one slip determiner that compares the rotation speed of the drive unit with the reference rotation speed to determine whether or not the tire is slipping, and a rotation speed control module that controls the rotation speed of the drive unit on the basis of a target rotation speed when the slip determiner determines that the tire is slipping, and controls a rotation speed of the tire on the basis of the target rotation speed when a slip of the tire comes under control.

The slip determiner may determine that the tire is slipping, on the basis of a comparison of a difference between the rotation speed of the drive unit and the reference rotation speed with a predetermined threshold.

The rotation speed control module may determine that the slip of the tire is coming under control, on the basis of a comparison of a difference between the rotation speed of the drive unit and the target rotation speed with a predetermined threshold.

When it is determined that the tire is slipping, on the basis of a comparison of the rotation speed of the drive unit with the reference rotation speed obtained by adding the torsional amount of the drive shaft to the rotation speed of the drive unit corresponding to the vehicle speed, the reference rotation speed calculating module may output the rotation speed of the drive unit corresponding to the vehicle speed as the reference rotation speed.

Another aspect of the present disclosure provides a vehicle control method including calculating a torsional amount of a drive shaft on the basis of a required torque, and adding the torsional amount to a rotation speed of at least one drive unit to calculate a reference rotation speed for a slip determination, the drive shaft transmitting a driving force of the drive unit to a corresponding tire, the rotation speed corresponding to a vehicle speed, comparing the rotation speed of the drive unit with the reference rotation speed to determine whether or not the tire is slipping, controlling the rotation speed of the drive unit on the basis of a target rotation speed when it is determined that the tire is slipping, determining whether or not a slip of the tire is coming under control, on the basis of a difference between the rotation speed of the drive unit and the target rotation speed, and controlling a rotation speed of the tire on the basis of the target rotation speed when it is determined that the slip of the tire is coming under control.

DETAILED DESCRIPTION

Figure 1:
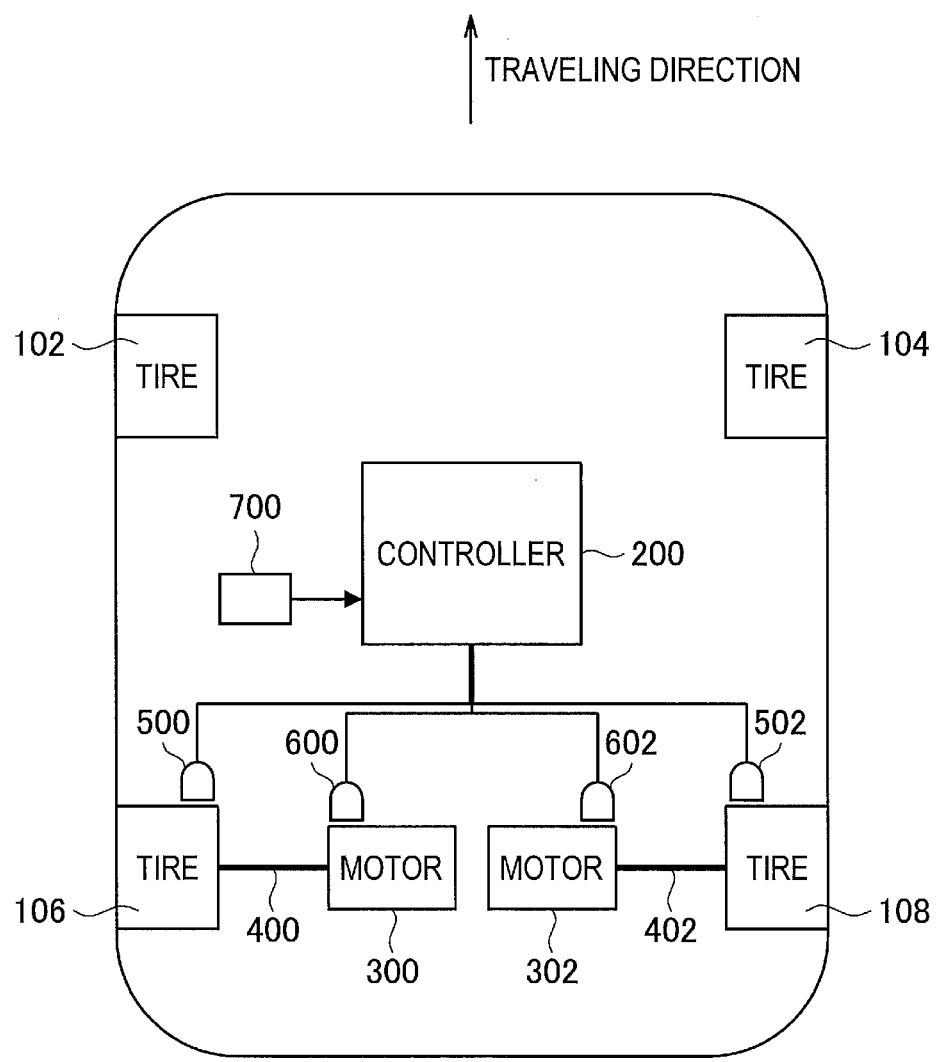
FIG. 1 is a schematic diagram illustrating a configuration of a vehicle according to an implementation of the present disclosure.

Hereinafter, a preferred implementation of the present disclosure will be described in detail with reference to the appended drawings. Note that, in this specification and the appended drawings, structural elements that have substantially the same function and structure are denoted with the same reference numerals, and repeated description of these structural elements is omitted.

First of all, with reference to FIG. 1, the configuration of a vehicle 100 according to the implementation of the present disclosure will be described. FIG. 1 is a schematic diagram illustrating the configuration of the vehicle 100 according to the implementation of the present disclosure. As illustrated in FIG. 1, the vehicle 100 includes four tires (wheels) 102, 104, 106 and 108, a vehicle control device (controller) 200, two motors (drive units) 300 and 302 that control the rotation of the respective rear wheel tires 106 and 108, drive shafts 400 and 402 that couple the respective motors 300 and 302 with the respective tires 106 and 108, wheel speed sensors 500 and 502 that detect the wheel speed of the respective rear wheel tires 106 and 108 from the rotation thereof, motor rotation speed sensors 600 and 602 that detect the rotation speed of the respective motors 300 and 302, and an acceleration sensor 700. Additionally, the motors 300 and 302 correspond to the "drive unit" of the appended claims in the present implementation. The vehicle 100 is configured as an electric vehicle that independently drives the left and right rear drive wheels (tires 106 and 108).

Figure 2:
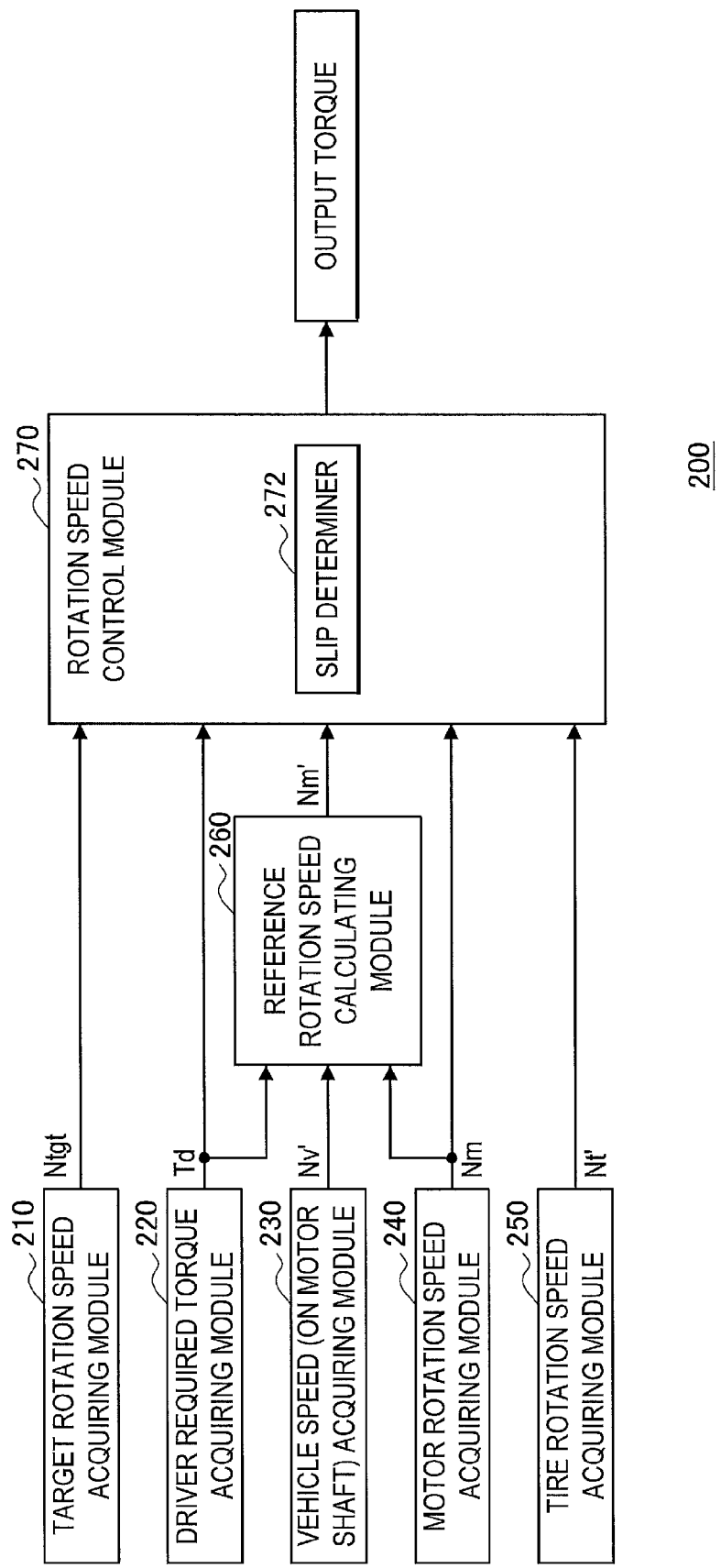
FIG. 2 is a schematic diagram illustrating a configuration of a vehicle control device.

FIG. 2 is a schematic diagram illustrating the configuration of a vehicle control device 200. As illustrated in FIG. 2, the vehicle control device 200 includes a target rotation speed acquiring module 210, a driver required torque acquiring module 220, a vehicle speed acquiring module 230, a motor rotation speed acquiring module 240, a tire rotation speed acquiring module 250, a reference rotation speed calculating module 260, and a rotation speed control module 270.

The target rotation speed acquiring module 210 acquires target rotation speed Ntgt. The target rotation speed Ntgt is obtained by converting an estimated vehicle speed value V' used as the vehicle speed of the vehicle 100 into the rotation speed on the shafts of the motors 300 and 302, and further adding a slip ratio. An accelerator position, a yaw rate of the vehicle 100, and a value of a steering angle are taken into consideration for calculating the target rotation speed Ntgt. The driver required torque acquiring module 220 acquires driver required torque Td from the position of an accelerator pedal. The vehicle speed acquiring module 230 acquires a value Nv' obtained by converting the vehicle speed into the rotation speed of the drive shafts of the motors 300 and 302. The motor rotation speed acquiring module 240 acquires motor rotation speed Nm detected by the motor rotation speed sensors 600 and 602. The tire rotation speed acquiring module 250 acquires a value Nt' obtained by converting the tire rotation speed into the rotation speed of the drive shafts of the motors 300 and 302 on the basis of the rotation speed of the tires 106 and 108 detected by the wheel speed sensors 500 and 502.

The rotation speed control module 270 includes a slip determiner 272. When a slip is determined, the rotation speed control module 270 exerts feedback control over the rotation speed of the motors 300 and 302 on the basis of the target rotation speed Ntgt. To the contrary, when no slip is determined, the rotation speed control module 270 exerts feedback control over the tire rotation speed Nt' on the basis of the target rotation speed Ntgt. In this way, feedback control is exerted by switching sensor values used for feedback between the motor rotation speed sensors 600 and 602, and the wheel speed sensors 500 and 502, which detect the wheel speed, in accordance with the slip determination result in the present implementation. These kinds of control are exerted on the basis of a value obtained by converting the wheel speed and the vehicle speed into the rotation speed on the drive shafts of the motors 300 and 302 in the present implementation. The rotation speed control module 270 exerts feedback control having functions of suppressing a slip, following target rotation speed (target slip ratio), and recovering from torque down.

Figure 3:
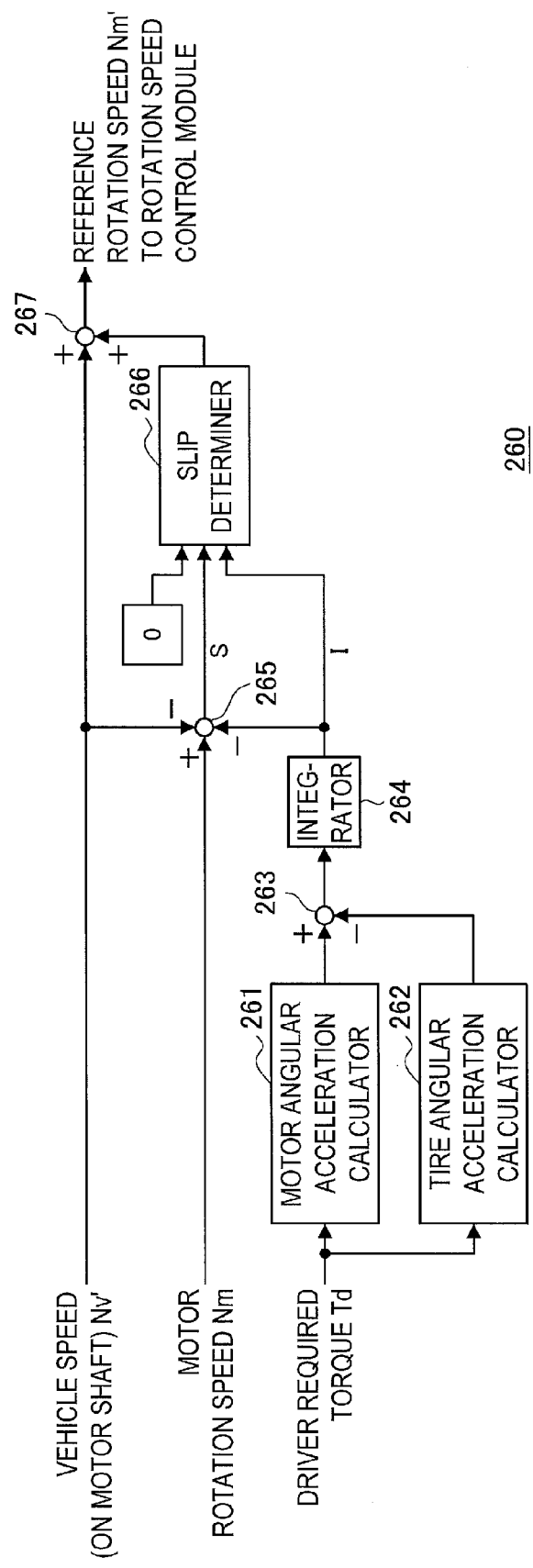
FIG. 3 is a schematic diagram illustrating a configuration of a reference rotation speed calculating module.

The reference rotation speed calculating module 260 calculates reference rotation speed Nm' that is a criterion for slip determinations. FIG. 3 is a schematic diagram illustrating the configuration of the reference rotation speed calculating module 260. The reference rotation speed calculating module 260 includes a motor angular acceleration calculator 261, a tire angular acceleration calculator 262, a subtractor 263, an integrator 264, an adder-subtractor 265, a slip determiner 266, and an adder 267. The reference rotation speed calculating module 260 receives required torque Td, vehicle speed Nv', and motor rotation speed Nm.

The reference rotation speed Nm' calculated by the reference rotation speed calculating module 260 is obtained by adding the torsional amount of the drive shafts 400 and 402 to the vehicle speed Nv' on the shafts of the motors 300 and 302. When the drive shafts 400 and 402 are predicted to undergo high torsion due to the driver required torque Td increased for accelerating from a standstill or the like, the reference rotation speed Nm' corresponding to non-slipped motor rotation speed is calculated from the required torque Td. The reference rotation speed Nm' calculated in this way is compared with the motor rotation speed Nm, thereby determining whether or not the tires 106 and 108 undergo a slip in the present implementation. The reference rotation speed Nm' obtained by adding the torsional amount of the drive shafts 400 and 402 to the vehicle speed Nv' corresponds to non-slipped motor rotation speed. Accordingly, when no slip occurs, the reference rotation speed Nm' matches with the motor rotation speed Nm, but when a slip occurs, the motor rotation speed Nm is higher than the reference rotation speed Nm' because the tires 106 and 108 redundantly rotate. Comparing the reference rotation speed Nm' with the motor rotation speed Nm thus makes it possible to determine whether or not the tires 106 and 108 undergo a slip when the drive shafts 400 and 402 are predicted to undergo high torsion.

The reference rotation speed calculating module 260 calculates the torsional amount of the drive shafts 400 and 402 from the driver required torque Td and adds the calculated torsional amount to the vehicle speed Nv' on the motor shafts to calculate the reference rotation speed Nm'. The required torque Td is thus input to the motor angular acceleration calculator 261 and the tire angular acceleration calculator 262.

Figure 4:
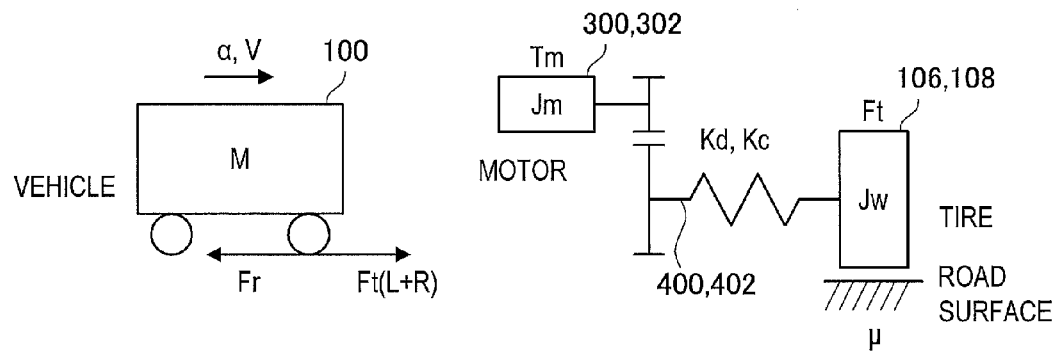
FIG. 4 is a schematic diagram illustrating a motion model of a vehicle.

FIG. 4 is a schematic diagram illustrating a motion model of the vehicle 100. As illustrated in FIG. 4, the vehicle 100 having weight M travels at speed V with acceleration α. At this time, longitudinal force Ft (L+R) of the left and right tires, and running resistance Fr are produced. Once the motors 300 and 302 produce torque Tm, the tires 106 and 108 produce the tire longitudinal force Ft. The torsional rigidity of the drive shafts 400 and 402, the damping force of the drive shafts 400 and 402, and a road surface friction coefficient are represented by Kd, Kc, and μ, respectively. Moreover, the inertia of the motors 300 and 302, and the inertia of the wheels (tires 106 and 108) are represented by Jm, and Jw, respectively.

The motor angular acceleration calculator 261 and the tire angular acceleration calculator 262 simultaneously solve the following motion equations (1) to (7) to calculate motor angular acceleration dωm/dt and wheel angular acceleration dωw/dt in the model of FIG. 4.

$$Tm - Td/N = Jm \cdot d\omega m/dt \quad (1)$$

$$Td - R \cdot Ft = Jw \cdot d\omega w/dt \quad (2)$$

$$Ft - Fr = M \cdot \alpha \quad (3)$$

$$Td = Kd\int(\omega m/N - \omega w)dt + Kc(\omega m/N - \omega w) \quad (4)$$

$$s(\text{braking tire slip ratio}) = (R \cdot \omega w - V)/V (V > R \cdot \omega w) \quad (5)$$

$$s(\text{driving tire slip ratio}) = (R \cdot \omega w - V)/R\omega (V \leq R \cdot \omega w) \quad (6)$$

$$Ft = \mu \cdot f(s) (f(s) \text{ is defined with a map, or set to be a constant}) \quad (7)$$

In the equations, the equation of (1) represents a motion equation of a motor, the equation of (2) represents a motion equation of a wheel, the equation of (3) represents a motion equation of a vehicle, the equation of (4) represents a motion equation of a drive shaft, the equations of (5) and (6) each represent a motion equation of a tire slip ratio, and the equation of (7) represents a motion equation of tire longitudinal force.

The constants and variables in the equations are defined as below.
<Constants>
Jm: motor inertia
Jw: wheel inertia
M: vehicle weight
N: reduction ratio
Kd: drive shaft torsional rigidity
Kc: drive shaft damping force
R: tire radius
μ: road surface friction coefficient
f(s): tire s–F characteristic map [N]
<Variables>
Tm: motor torque [N·m]
Td: drive shaft torque [N·m]
Ft: tire longitudinal force [N]
Fr: running resistance [N] ωm: motor angular velocity [rad/s]
ωw: wheel angular velocity [rad/s]
V: vehicle speed [m/s]
dωm/dt: motor angular acceleration [rad/s²]
dωw/dt: wheel angular acceleration [rad/s²]
α: vehicle acceleration [m/s²]
s: tire slip ratio In this way, referring to FIG. 3, the motor angular acceleration calculator 261 calculates motor angular acceleration dωm/dt, and the tire angular acceleration calculator 262 calculates tire angular acceleration dωw/dt. The subtractor 263 calculates a value obtained by subtracting the tire angular acceleration dωw/dt from the motor angular acceleration dωm/dt, and the integrator 264 integrates results of the subtraction by the subtractor 263 to obtain the rotation speed. The integrated value I resulting from the integration by the integrator 264 corresponds to a difference due to torsion of the drive shaft 400 (or 402) between the rotation speed of the motor 300 (or 302) and the rotation speed of the tire 106 (or 108). Adding the vehicle speed Nv' to the integrated value I thus makes it possible to calculate the reference rotation speed Nm' based on the torsional amount of the drive shaft.

The adder-subtractor 265 receives the vehicle speed Nv', the integrated value I, and the motor rotation speed Nm. The adder-subtractor 265 obtains a difference S (=Nm−Nm') between the motor rotation speed Nm and the reference rotation speed Nm' by adding the vehicle speed Nv' to the integrated value I. The absolute value of the difference S between the motor rotation speed Nm and the reference rotation speed Nm', which is obtained by the adder-subtractor 265, is input to the slip determiner 266.

The slip determiner 266 compares the difference S between the motor rotation speed Nm and the reference rotation speed Nm' with a predetermined slip determination threshold n1. If the difference S between the motor rotation speed Nm and the reference rotation speed Nm' is greater than or equal to the threshold n1, the slip determiner 266 then determines that a slip occurs. As discussed above, if no slip occurs, the motor rotation speed Nm matches with the reference rotation speed Nm', but if a slip occurs, the motor reference speed Nm differs from the reference rotation speed Nm', so that comparing the difference S between the motor rotation speed Nm and the reference rotation speed Nm' with the predetermined slip determination threshold n1 makes it possible to make a slip determination.

If it is determined that a slip occurs, the slip determiner 266 outputs "0" to the adder 267. To the contrary, if it is determined that no slip occurs, the slip determiner 266 outputs the integrated value I to the adder 267.

The adder 267 receives the vehicle speed Nv'. If the slip determiner 266 determines a slip, the torsional amount of the drive shafts 400 and 402 is "0." Accordingly, the reference rotation speed Nm' obtained by adding the vehicle speed Nv' to the value "0" input from the slip determiner 266 in the adder 267 is output to the rotation speed control module 270. In this case, the reference rotation speed Nm' matches with the vehicle speed Nv'.

To the contrary, if the slip determiner 266 determines no slip, the reference rotation speed Nm' obtained by adding the vehicle speed Nv' to the integrated value I in the adder 267 is output to the rotation speed control module 270. If the slip determiner 266 determines a slip, the reference rotation speed Nm' output from the adder 267 is thus corrected into the vehicle speed Nv'.

In this way, the reference rotation speed calculating module 260 corrects the reference rotation speed Nm' into the vehicle speed Nv' and outputs the corrected reference rotation speed Nm' to the rotation speed control module 270 if a slip is determined, while the reference rotation speed calculating module 260 outputs a value obtained by adding the integrated value I to the vehicle speed Nv' as the reference rotation speed Nm' if no slip is determined The slip determiner 272 of the rotation speed control module 270 makes the same slip determination on the basis of the reference rotation speed Nm' output from the reference rotation speed calculating module 260.

If a slip is determined, the rotation speed control module 270 exerts feedback control over the rotation speed of the motors 300 and 302 on the basis of the target rotation speed Ntgt and outputs output torque for the feedback control. To the contrary, if no slip is determined, the rotation speed control module 270 exerts feedback control over the tire rotation speed Nt' on the basis of the target rotation speed Ntgt and outputs output torque for the feedback control. Accordingly, the slip determiner 272 of the rotation speed control module 270 uses the input reference rotation speed Nm' to determine the presence or absence of a slip in the same way as the slip determiner 266 of the reference rotation speed calculating module 260 does. If the slip determiner 266 of the reference rotation speed calculating module 260 determines a slip, the reference rotation speed Nm' is corrected into the vehicle speed Nv'. Accordingly, a value corresponding to the torsional amount is set as "0," and a slip determination can be made with higher accuracy.

The slip determiner 272 makes a slip determination by comparing the difference between the motor rotation speed Nm and the reference rotation speed Nm' with the predetermined slip determination threshold n1. When a slip is determined, the rotation speed control module 270 exerts feedback control over the motor rotation speed Nm on the basis of the target rotation speed Ntgt. If a slip comes under control as a result of the feedback control over the motor rotation speed Nm based on the target rotation speed Ntgt, the rotation speed control module 270 exerts feedback control over the tire rotation speed Nt' on the basis of the target rotation speed Ntgt. Alternatively, the rotation speed control module 270 may receive a result of a slip determination from the slip determiner 266 of the reference rotation speed calculating module 260 and exert feedback control over the motor rotation speed Nm or the tire rotation speed Nt' without making any slip determination by itself.

In this way, in the case that a slip is determined, feedback control over the motor rotation speed Nm is exerted, and then the feedback control switched to feedback control over the tire rotation speed Nt' when a slip comes under control, whereby it is possible to securely prevent vibration due to torsion of the drive shafts 400 and 402.

Figure 5:
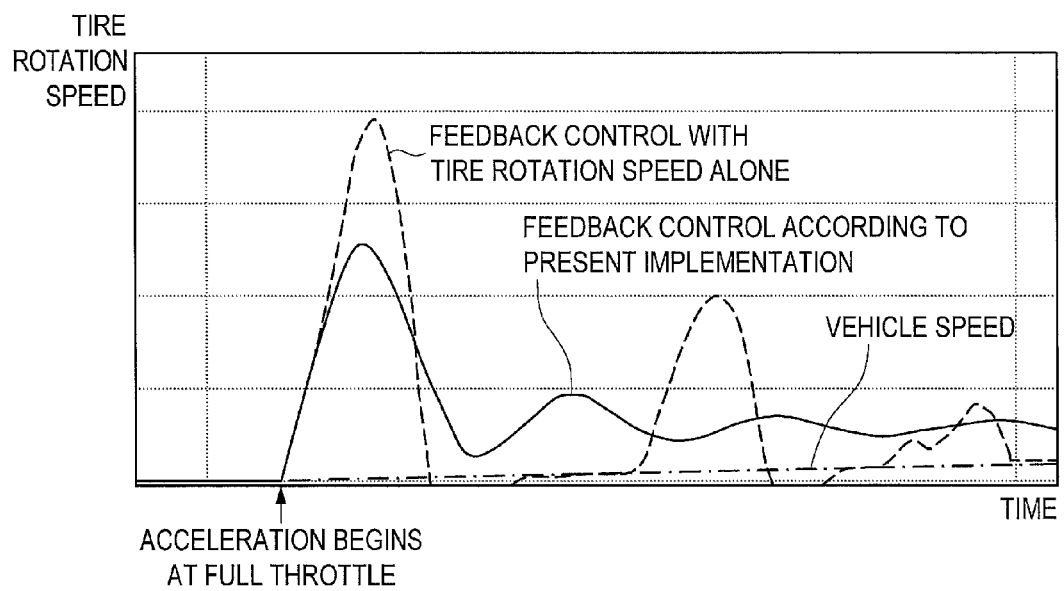
FIG. 5 is a characteristic diagram illustrating a comparison of feedback control (solid line) according to the present implementation with feedback control (dashed line) with tire rotation speed alone.

FIG. 5 is a characteristic diagram illustrating a comparison of feedback control (solid line) according to the present implementation with feedback control (dashed line) with tire rotation speed alone, where the horizontal axis represents time and the vertical axis represents tire rotation speed. FIG. 5 illustrates a simulation of a road surface friction coefficient µ of 0.1 and acceleration at full throttle from a standstill.

Referring to FIG. 5, regarding the feedback control (solid line) according to the present implementation, once a slip is determined, feedback control is exerted over the motor rotation Nm in a manner that the motor rotation Nm approximates the target rotation speed Ntgt, and then feedback control is exerted over the tire rotation speed Nt on the basis of the target rotation speed Ntgt as the motor rotation speed Nm approximates the target rotation speed Ntgt. Meanwhile, regarding the feedback control (dashed line) with tire rotation speed alone, which is illustrated for comparison, feedback control is exerted over the tire rotation speed Nt' alone in acceleration at full throttle in a manner that the tire rotation speed Nt' approximates the target rotation speed Ntgt.

As illustrated in FIG. 5, characteristics indicated by both of the solid line and the dashed line cause tire slips and sharply increase the rotation speed once acceleration begins at full throttle. The feedback control (dashed line) based on tire rotation speed alone, however, has much time delay as discussed above, and causes the tire rotation speed to considerably increase during the time delay. In the present implementation, once a slip is determined, feedback control is exerted with the motor rotation speed Nm, which is more responsive in detection, showing that the feedback control (solid line) according to the present implementation maintains tire rotation speed lower immediately after acceleration begins, and suppresses a slip more. The feedback control (solid line) according to the present implementation also suppresses more hunting of the tire rotation speed after a slip comes under control.

Figure 6:
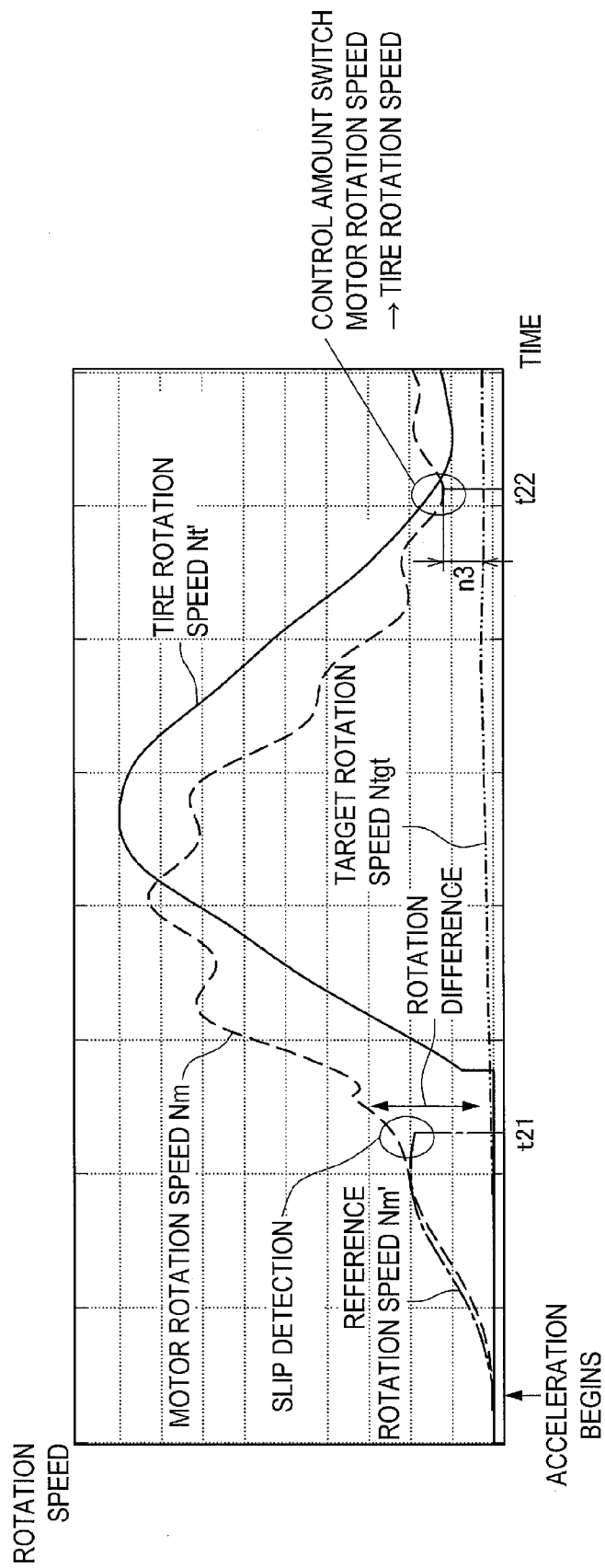
FIG. 6 is a characteristic diagram illustrating, in detail, behavior of rotation speed under the feedback control according to the present implementation illustrated in FIG. 5.

FIG. 6 is a characteristic diagram illustrating, in detail, the behavior of rotation speed under the feedback control according to the present implementation illustrated in FIG. 5. Here, the vertical axis of FIG. 6 represents rotation speed converted into the rotation speed on the shafts of the motors 300 and 302, and the horizontal axis represents time. FIG. 6 illustrates how the reference rotation speed Nm' (one-dot chain line), the motor rotation speed Nm (dashed line), the target rotation speed Ntgt (two-dot chain line), and the tire rotation speed Nt' (solid line) each change in acceleration from a standstill.

As illustrated in FIG. 6, acceleration from a standstill increases both of the motor rotation speed Nm and the reference rotation speed Nm'. The motor rotation speed Nm then differs from the reference rotation speed Nm' at time t21, and the difference S therebetween becomes greater than or equal to the predetermined slip determination threshold n1. This determines that a slip occurs, and feedback control is exerted between the target rotation speed Ntgt and the motor rotation speed Nm. Accordingly, the motor rotation speed Nm is controlled to be low at the time t21 or later in a manner that the motor rotation speed Nm approximates the target rotation speed Ntgt, which can minimize a slip. The motor rotation speed Nm has less time delay and is more responsive, so that it becomes possible to quickly detect a slip and to effectively suppress a slip immediately after acceleration begins. Thus, as illustrated in FIG. 6, it becomes possible to detect the occurrence of a slip even before the tire rotation speed Nt' increases, so that it is possible to securely suppress a slip. Additionally, the motor rotation speed Nm is controlled to be low at the time t21 or later in a manner that the motor rotation speed Nm approximates the target rotation speed Ntgt, which consequently controls the rotation speed of the tire rotation speed Nt' in a manner that the rotation speed of the tire rotation speed Nt' becomes low.

Thereafter, once a difference between the motor rotation speed Nm and the target rotation speed Ntgt becomes less than or equal to a predetermined threshold n3 at time t22, the control amount of feedback control is switched from the motor rotation speed Nm to the tire rotation speed Nt'. Thus, feedback control is exerted over the tire rotation speed Nt' on the basis of the target rotation speed Ntgt at the time t22 or later. Accordingly, it becomes possible to effectively suppress vibration due to torsion of the drive shafts 400 and 402 by exerting feedback control over the rotation speed of the motors 300 and 302 with the tire rotation speed Nt' via none of the drive shafts 400 and 402. It is thus possible simultaneously to enhance the responsiveness of a slip determination, and to ensure the stability by suppressing vibration.

Figure 7:
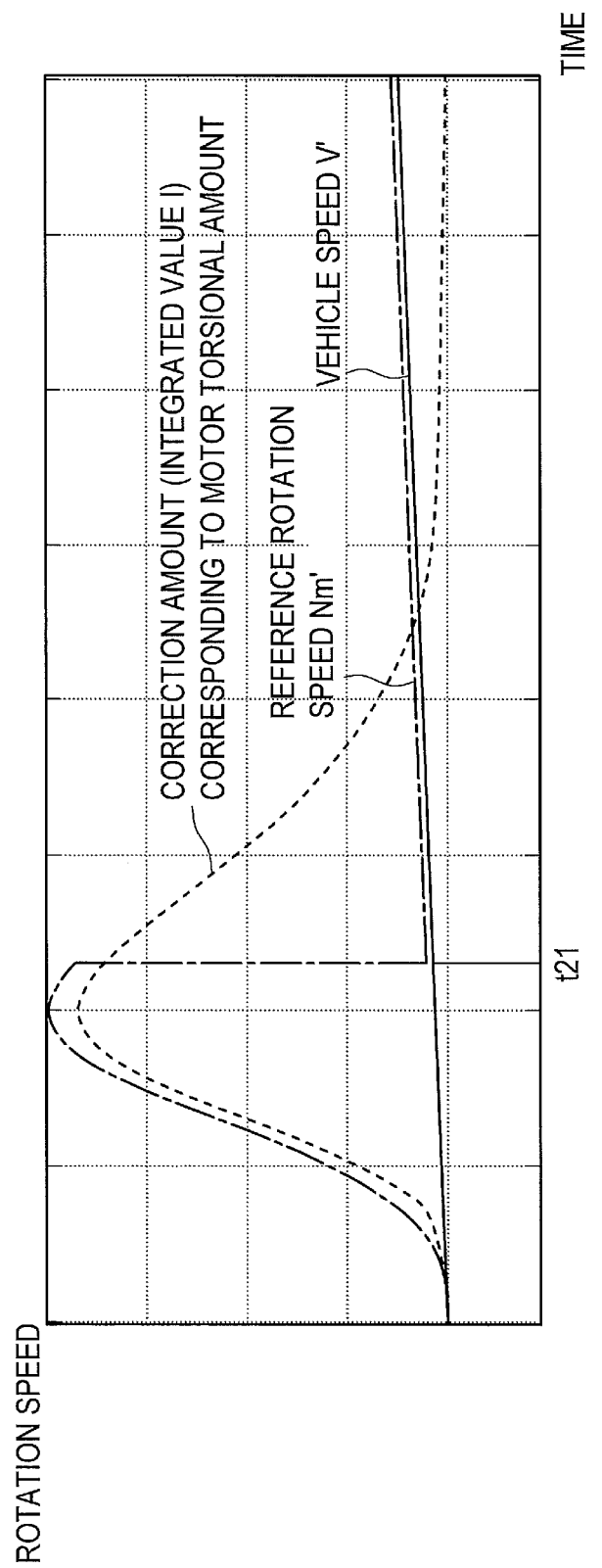
FIG. 7 is a characteristic diagram illustrating a relationship between reference rotation speed Nm' and a correction amount (integrated value I) corresponding to a torsional amount of a drive shaft.

FIG. 7 is a characteristic diagram illustrating a relationship between the reference rotation speed Nm' and the correction amount (integrated value I) corresponding to the torsional amount of the drive shafts 400 and 402, and enlarges the scale of the vertical axis as compared with FIG. 6. As discussed above, the reference rotation speed Nm' is obtained by adding the correction amount (integrated value I) corresponding to the torsional amount of the drive shafts 400 and 402 to the vehicle speed V'. As illustrated in FIG. 7, the correction amount corresponding to the torsional amount of the drive shafts 400 and 402 increases in acceleration from a standstill in accordance with the required torque Td, and the torsional amount decreases after reaching a maximum value. Accordingly, the reference rotation speed Nm' increases until just before time t21 with an increase in the correction amount corresponding to the torsional amount.

If a slip is determined at the time t21, the reference rotation speed Nm' becomes equal to the vehicle speed V' because the correction amount (integrated value I) corresponding to the torsional amount of the drive shafts 400 and 402 will not be added to the vehicle speed V' in the later calculation of the reference rotation speed Nm'.

According to the present implementation as described above, it is possible to securely suppress a slip by making a slip determination on the basis of a comparison between the reference rotation speed Nm' and the motor rotation speed Nm, and exerting feedback control with the motor rotation speed Nm if a slip is determined. When a difference between the motor rotation speed Nm and the target rotation speed Ntgt becomes less than or equal to a predetermined threshold n3, a slip is coming under control and exerting feedback control with the tire rotation speed Nt' makes it possible to securely prevent controllability from degrading because of torsional vibration of the drive shafts 400 and 402.

Next, on the basis of the flowchart of FIG. 8, a process performed by the vehicle control device according to the present implementation will be described. First of all, in step S10, an estimated vehicle speed value V' is calculated. The estimated vehicle speed value V' can be estimated from tire angular velocity detected by the wheel speed sensor 500, but can also be estimated from speed obtained by integrating the acceleration of the vehicle 100 if a slip occurs. The acceleration of the vehicle is obtained from a detection value of the acceleration sensor 700. If the vehicle 100 includes a GPS, the estimated value can also be corrected with a detection value of the GPS to enhance the accuracy.

In next step S12, the target rotation speed Ntgt is calculated. As discussed above, the target rotation speed Ntgt is obtained by converting the estimated vehicle speed value V' into the rotation speed on the shafts of the motors 300 and 302, and further adding a slip ratio. The target rotation speed Ntgt is a target value for rotation speed control exerted by the rotation speed control module 270. The rotation speed control module 270 exerts feedback control on the basis of the target rotation speed Ntgt. In next step S14, the vehicle speed Nv' on the shafts of the motors 300 and 302 is calculated. The vehicle speed Nv' is a value obtained by converting the estimated vehicle speed value V' into the rotation speed on the shafts of the motors 300 and 302.

In next step S16, the motor rotation speed Nm is acquired. In next step S18, the tire rotation speed Nt' is calculated. The tire rotation speed Nt' is calculated by converting the tire rotation speed detected by the wheel speed sensor 500 into the rotation speed on the shafts of the motors 300 and 302. In the case that, for example, there are decelerating mechanisms such as gears between the tires 106 and 108 and the motors 300 and 302, the tire rotation speed Nt' is calculated on the basis of the reduction ratios.

In next step S20, a change amount ΔTd of driver required torque Td is calculated. The change amount ΔTd is obtained from the amount of change in the required torque Td within a predetermined time. In next step S22, it is determined whether or not the change amount ΔTd is greater than or equal to a threshold Δt1 for a torque sharp increase determination, and if ΔTd>Δt1 is satisfied, the process proceeds to step S24.

In step S24, the reference rotation speed Nm' is calculated. As discussed above, the reference rotation speed Nm' is an estimated value of motor rotation speed estimated on the basis of non-slipped torsion of the drive shafts 400 and 402, and calculated by adding the torsional amount (integrated value I) of the drive shafts 400 and 402 to the vehicle speed Nv'.

In next step S26, it is determined whether or not a difference between the motor rotation speed Nm and the reference rotation speed Nm' is greater than or equal to the predetermined slip determination threshold n1. If Nm−Nm'≥n1 is satisfied, it is determined that a slip occurs, and then the process proceeds to step S28. In step S28, feedback control is exerted over the motor rotation speed Nm on the basis of the target rotation speed Ntgt. Meanwhile, if Nm−Nm'<n1 is satisfied in step S26, the process terminates (END).

The process proceeds to step S30 after step S28, and it is determined whether or not a difference between the motor rotation speed Nm and the target rotation speed Ntgt is less than or equal to a predetermined threshold n3. Here, the threshold n3 is used for switching a control amount from the motor rotation speed Nm to the tire rotation speed Nt'. If Nm−Ntgt≤n3 is satisfied, the motor rotation speed Nm approximates the target rotation speed Ntgt and a slip is supposed to be coming under control, so that the process proceeds to step S32 and feedback control is exerted over the tire rotation speed Nt' on the basis of the target rotation speed Ntgt. Meanwhile, if Nm−Ntgt>n3 is satisfied in step S30, the process returns to step S28.

The process proceeds to step S34 after step S32, and it is determined whether or not a difference between the tire rotation speed Nt' and the target rotation speed Ntgt is less than or equal to a predetermined threshold n4. Here, the threshold n4 is used for determining whether or not a slip has come under control. If Nt'−Ntgt≤n4 is satisfied, the tire rotation speed Nt' approximates the target rotation speed Ntgt and a slip is supposed to have come under control, so that the process terminates (END). Meanwhile, if Nt'−Ntgt>n4 is satisfied in step S34, the process returns to step S32.

If ΔTd<Δt1 is satisfied in step S22, the process proceeds to step S40 onward. If ΔTd<Δt1 is satisfied in step S20, there is no sharp increase in the required torque Td, so that no slip determination is made with the motor rotation speed Nm in step S40 onward, but feedback control is exerted with the tire rotation speed Nt'.

First of all, in step S40, it is determined whether or not a difference between the tire rotation speed Nt' and the vehicle speed Nv' is greater than or equal to a predetermined threshold n2. Here, the threshold n2 is used for determining a slip on the basis of the tire rotation speed Nt' and the vehicle speed Nt'. If Nt'−Nv'≥n2 is satisfied, the process proceeds to step S42 and then feedback control is exerted over the tire rotation speed Nt' on the basis of the target rotation speed Ntgt. Meanwhile, if Nt'−Nv'<n2 is satisfied, the process terminates because the tire rotation speed Nt' is approximate to the vehicle speed Nv'.

The process proceeds to step S44 after step S42. In step S44, it is determined whether or not the difference between the tire rotation speed Nt' and the target rotation speed Ntgt is less than or equal to the predetermined threshold n4. If Nt'−Ntgt≤n4 is satisfied, the process terminates. Meanwhile, if Nt'−Ntgt>n4 is satisfied, the process returns to step S42.

Figure 8:
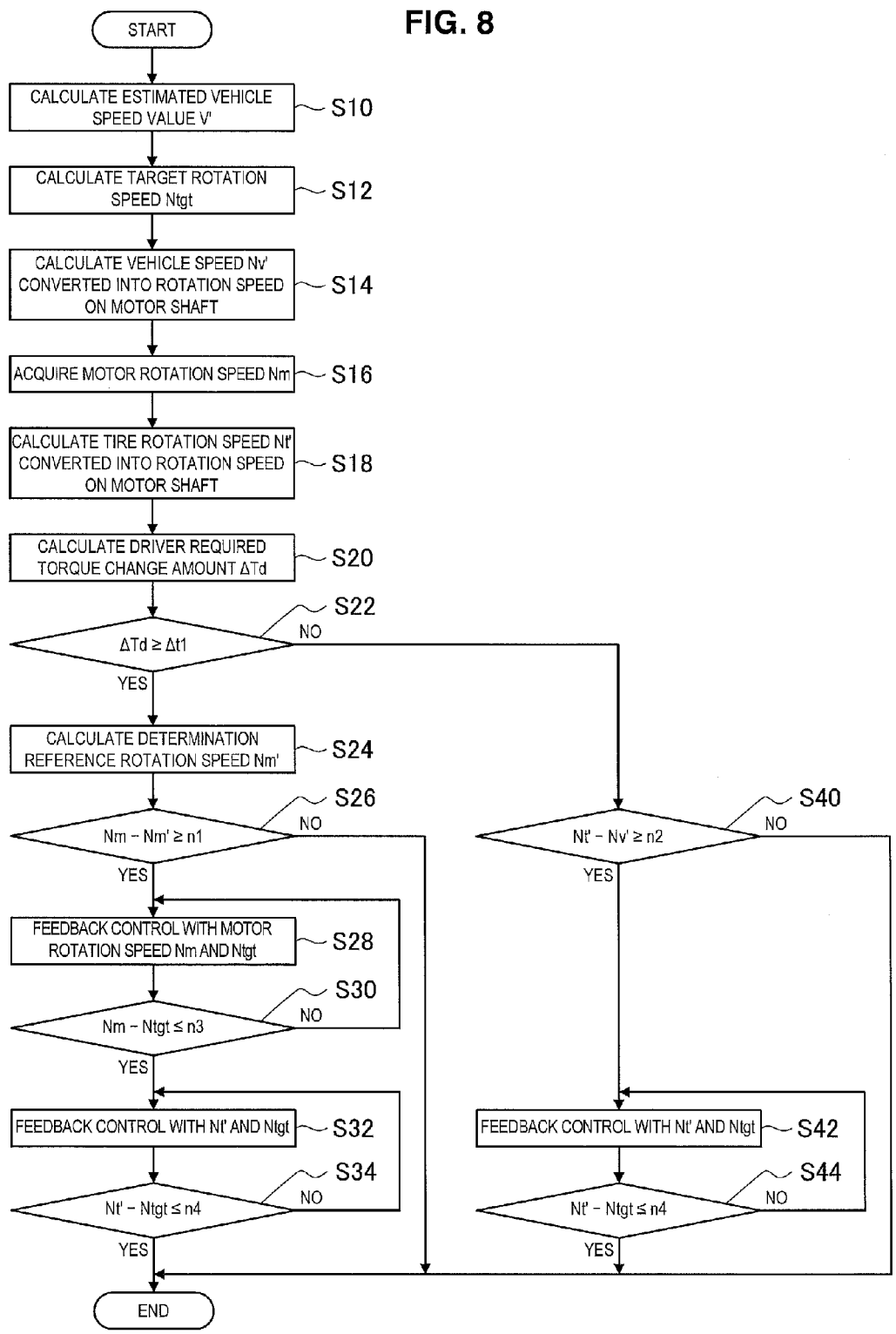
FIG. 8 is a flowchart illustrating a process performed by the vehicle control device according to the present implementation.

According to the process of FIG. 8 as described above, if the difference between the motor rotation speed Nm and the reference rotation speed Nm' is greater than or equal to the predetermined threshold n1, a slip is determined and feedback control is exerted with the motor rotation speed Nm. Accordingly, it is possible to securely suppress a slip at an early stage of acceleration. If the difference between the motor rotation speed Nm and the target rotation speed Ntgt becomes less than or equal to the predetermined threshold n3 as a result of the feedback control with the motor rotation speed Nm, feedback control is exerted with the tire rotation speed Nt'. Thus, it is possible to securely prevent controllability from degrading due to torsional vibration of the drive shafts 400 and 402.

According to the present implementation as described above, it is possible to quickly detect a slip immediately after acceleration begins on the basis of a difference between the reference rotation speed Nm' and the motor rotation speed Nm. If a slip is determined, feedback control over the motor rotation speed Nm based on the target rotation speed Ntgt can effectively suppress a slip. If a slip comes under control as a result of the feedback control over the motor rotation speed Nm based on the target rotation speed Ntgt, feedback control over the tire rotation speed Nt' based on the target rotation speed Ntgt can securely prevent vibration due to deflection of the drive shafts 400 and 402. According to the implementation of the present disclosure, it becomes possible to instantaneously determine a slip of a tire in driving the tire via a drive shaft, suppress the slip, and prevent torsional vibration of the drive shaft from reducing controllability.

Although the preferred implementation of the present disclosure has been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

The invention claimed is:

1. A vehicle control device comprising:
at least one drive unit that drives a corresponding tire via a drive shaft;
a reference rotation speed calculating module that calculates a torsional amount of the drive shaft on the basis of a required torque, and outputs a reference rotation speed for a slip determination, the reference rotation speed being obtained by adding the torsional amount to a rotation speed of the drive unit, the rotation speed corresponding to a vehicle speed;
at least one slip determiner that compares the rotation speed of the drive unit with the reference rotation speed to determine whether or not the tire is slipping; and
a rotation speed control module that controls the rotation speed of the drive unit on the basis of a target rotation speed when the slip determiner determines that the tire is slipping, and controls a rotation speed of the tire on the basis of the target rotation speed when a slip of the tire comes under control.

2. The vehicle control device according to claim 1, wherein the slip determiner determines that the tire is slipping, on the basis of a comparison of a difference between the rotation speed of the drive unit and the reference rotation speed with a predetermined threshold.

3. The vehicle control device according to claim 1, wherein the rotation speed control module determines that the slip of the tire is coming under control, on the basis of a comparison of a difference between the rotation speed of the drive unit and the target rotation speed with a predetermined threshold.

4. The vehicle control device according to claim 1, wherein, when it is determined that the tire is slipping, on the basis of a comparison of the rotation speed of the drive unit with the reference rotation speed obtained by adding the torsional amount of the drive shaft to the rotation speed of the drive unit corresponding to the vehicle speed, the reference rotation speed calculating module outputs the rotation speed of the drive unit corresponding to the vehicle speed as the reference rotation speed.

5. A vehicle control method comprising:
calculating a torsional amount of a drive shaft on the basis of a required torque, and adding the torsional amount to a rotation speed of at least one drive unit to calculate a reference rotation speed for a slip determination, the drive shaft transmitting a driving force of the drive unit to a corresponding tire, the rotation speed corresponding to a vehicle speed;
comparing the rotation speed of the drive unit with the reference rotation speed to determine whether or not the tire is slipping;
controlling the rotation speed of the drive unit on the basis of a target rotation speed when it is determined that the tire is slipping;
determining whether or not a slip of the tire is coming under control, on the basis of a difference between the rotation speed of the drive unit and the target rotation speed; and
controlling a rotation speed of the tire on the basis of the target rotation speed when it is determined that the slip of the tire is coming under control.

* * * * *